US010946271B2

(12) United States Patent
Forster (10) Patent No.: US 10,946,271 B2
(45) Date of Patent: Mar. 16, 2021

(54) CONTROLLING DATA PROCESSING (71) Applicant: Sony Interactive Entertainment Inc., Tokyo (JP)

(72) Inventor: Richard James Forster, London (GB)

(73) Assignee: Sony Interactive Entertainment Inc., Tokyo (JP)

(*) Notice: Subject to any disclaimer, the term of this patent is extended or adjusted under 35 U.S.C. 154(b) by 61 days.

(21) Appl. No.: 16/283,961

(22) Filed: Feb. 25, 2019

(65) Prior Publication Data

US 2019/0262701 A1 Aug. 29, 2019

(30) Foreign Application Priority Data

Feb. 26, 2018 (GB) .................................... 1803061

(51) Int. Cl.
*A63F 13/235* (2014.01)
*G06F 3/03* (2006.01)
*G06F 3/0346* (2013.01)
*G06F 3/038* (2013.01)

(52) U.S. Cl.
CPC .......... *A63F 13/235* (2014.09); *G06F 3/0325* (2013.01); *G06F 3/0346* (2013.01); *G06F 3/0383* (2013.01)

(58) Field of Classification Search
CPC ...... A63F 13/24; A63F 13/213; A63F 13/235; A63F 13/211; G06F 3/0325; G06F 3/011; G06F 3/0383; G06F 3/0346
USPC .......................................................... 463/39
See application file for complete search history.

(56) References Cited

U.S. PATENT DOCUMENTS

| 8,287,373 B2* | 10/2012 | Marks ..................... G06F 3/016 463/36 |
| 8,323,106 B2* | 12/2012 | Zalewski .............. G06F 3/0304 463/31 |
| 2005/0212752 A1* | 9/2005 | Marvit ..................... G06F 3/017 345/156 |
| 2010/0149341 A1 | 6/2010 | Marks |
| 2010/0150404 A1 | 6/2010 | Marks |
| 2012/0293630 A1 | 11/2012 | Persaud |
| 2014/0228096 A1* | 8/2014 | Detlefsen ............ G07F 17/3218 463/25 |
| 2017/0087455 A1 | 3/2017 | Glennblack |
| 2017/0361222 A1* | 12/2017 | Tsuchiya ................. A63F 13/24 |

FOREIGN PATENT DOCUMENTS

| GB | 2524492 A | 9/2015 |
| GB | 3098782 A1 | 8/2018 |

OTHER PUBLICATIONS

Combined Search and Examination Report for corresponding Application GB1803061.9, 4 pages, dated Aug. 28, 2018.
Examination Report for corresponding Application GB1803061.9, 2 pages, dated Aug. 25, 2020.

* cited by examiner

*Primary Examiner* — Michael A Cuff
(74) *Attorney, Agent, or Firm* — Matthew B. Dernier, Esq.

(57) ABSTRACT

A control apparatus includes two or more user control devices, each user control device having an inertial detector having a wireless communications module to communicate inertial detection results, and an illuminated portion; and a housing to house the two or more control devices so that the two or more control devices are constrained to move with one another but having an obscured portion so as to obscure all but one of the illuminated portions of the two or more control devices.

9 Claims, 6 Drawing Sheets

CONTROLLING DATA PROCESSING

BACKGROUND

Field of the Disclosure

This disclosure relates to controlling data processing.

Description of the Prior Art

Some data processing activities may be controlled by a detection of a trackable device, for example.

An example arrangement involves a games machine, in which movements of a device such as a head mountable display (HMD) and/or a hand-holdable controller such as a Sony® Move® Controller, can be tracked by one or more cameras.

In a so-called mixed reality system (for example, being capable of combining features of real and virtual environments in a display presented to the user), it may be that multiple cameras are in use, for example a camera to obtain images of the user, for example in order to track the user's position and/or activity, and one or more cameras to capture images of the user's real environment. There is a need to be able to spatially align the frames of reference of the captured images obtained from the various cameras.

The foregoing paragraphs have been provided by way of general introduction, and are not intended to limit the scope of the following claims. The described embodiments, together with further advantages, will be best understood by reference to the following detailed description taken in conjunction with the accompanying drawings.

Various aspects and features of the present disclosure are defined in the appended claims and within the text of the accompanying description and include at least a head mountable apparatus such as a display and a method of operating a head-mountable apparatus as well as a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
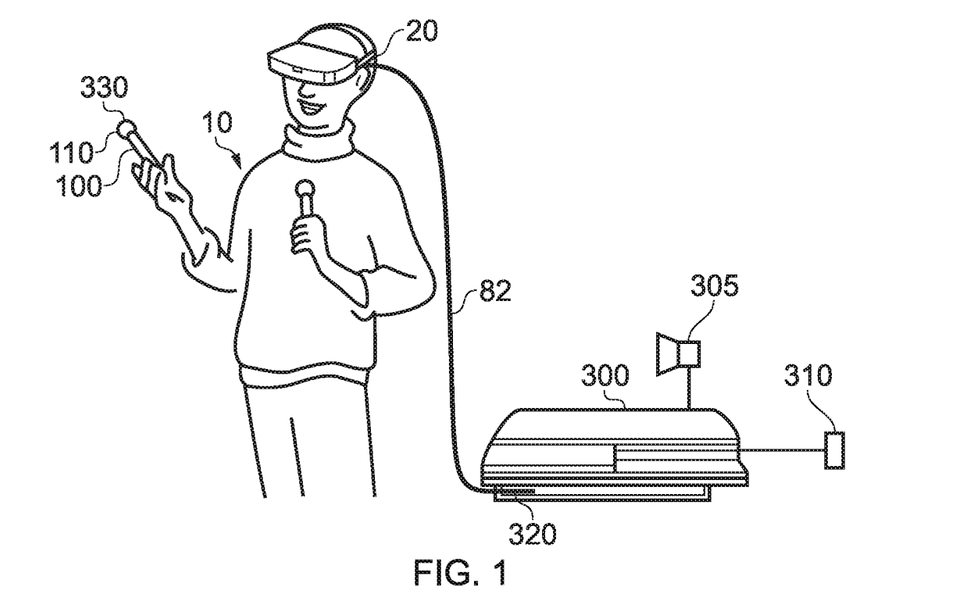
FIGS. 1 and 2 schematically illustrate a user playing a game using a Sony® PlayStation® games console.

Referring to the drawings, FIG. 1 schematically illustrates a user wearing a head-mountable display (HMD) connected to a Sony® PlayStation® games console 300 as an example of a base device. The games console 300 is connected to a mains power supply 310 and (optionally) to a main display screen (not shown). A cable 82, acting as power supply and signal cables, links the HMD 20 to the games console 300 and is, for example, plugged into a USB socket 320 on the console 300.

In FIG. 1, the user is also shown holding a hand-held controller 330 which may be, for example, a Sony® Move® controller which communicates wirelessly with the games console 300 to control (or to contribute to the control of) operations relating to a currently executed program at the games console.

A camera 305 is associated with the console 300 to capture images of the user 10 and/or the controller 330.

The Move controller comprises a handle portion 100 and an illuminated end portion 110. The handle portion 100 can carry one or more control buttons and houses a so-called inertial measurement unit (IMU) which will be described in more detail below. The illuminated end portion 110 comprises one or more light emitting diodes (LEDs) inside a translucent spherical shell and which are capable of being illuminated, for example under the control of an apparatus such as the games console 300.

The Move controller 330 provides an example of a control device comprising an elongate handle portion 100 which houses the inertial detector 332, 334 and an illuminated end portion 110 at an end of the handle portion.

In use, the IMU transmits inertial detections to the games console 300 and the games console 300 also tracks, using images captured by the camera 305, the location of the illuminated end portion 110.

A pair of video displays in the HMD 20 are arranged to display images provided via the games console 300, and a pair of earpieces 60 in the HMD 20 are arranged to reproduce audio signals generated by the games console 300. The games console may be in communication with a video server. The USB connection from the games console 300 also provides power to the HMD 20, according to the USB standard.

Figure 2:
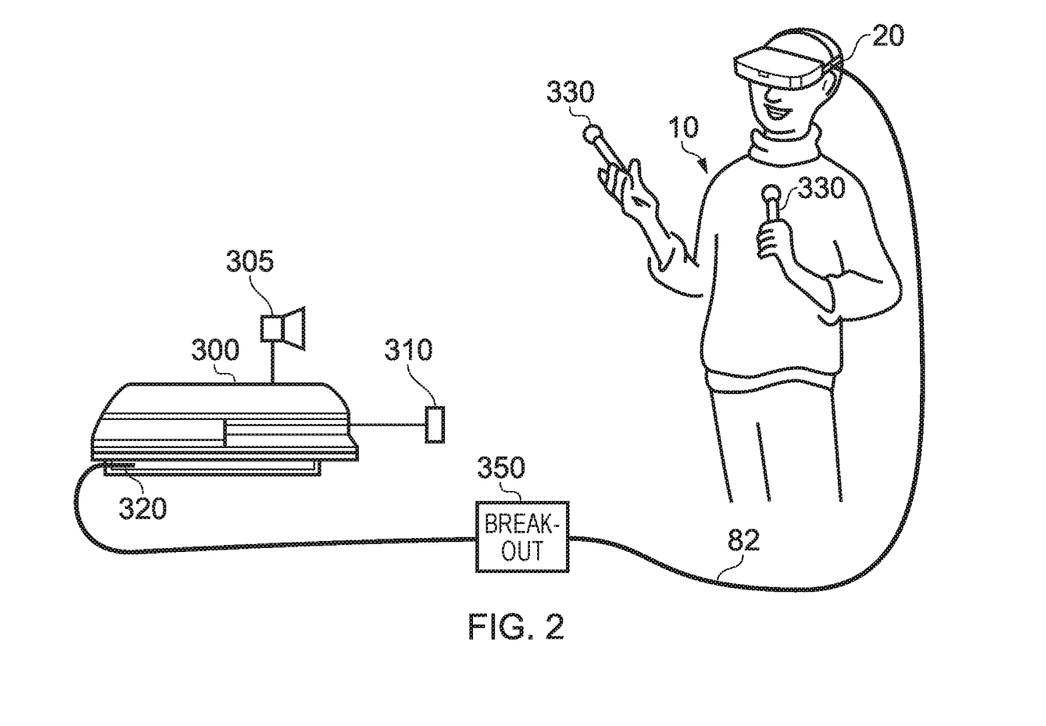

FIG. 2 schematically illustrates a similar arrangement in which the games console is connected (by a wired or wireless link) to a so-called "break out box" acting as a base or intermediate device 350, to which the HMD 20 is connected by a cabled link 82. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 350 is fixed to the ground or to a piece of furniture, but rather than having a very long trailing cable from the games console 300, the break-out box provides a locally weighted point so that the cable 82 linking the HMD 20 to the break-out box will tend to move around the position of the break-out box. This can improve user safety and comfort by avoiding the use of very long trailing cables.

Figure 3:
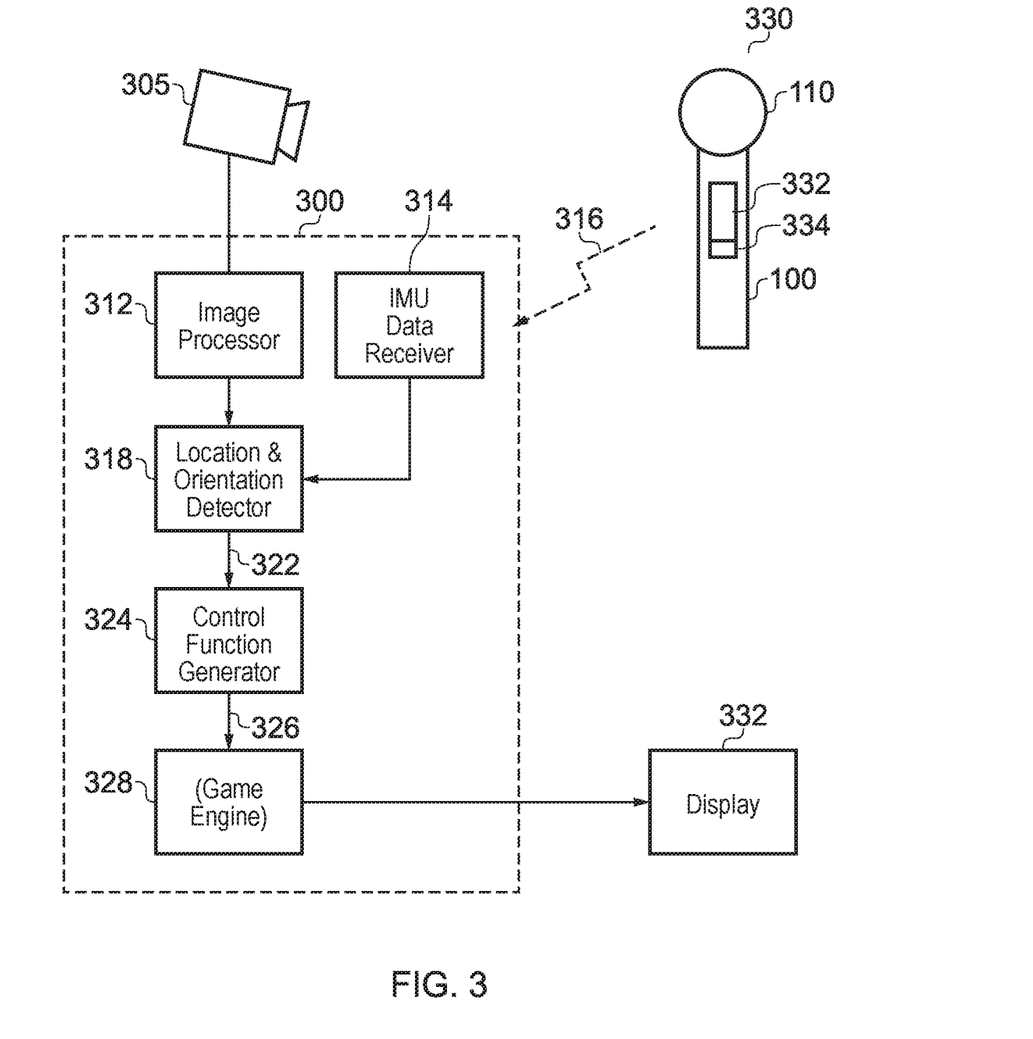
FIG. 3 schematically illustrates the use of a control device.

FIG. 3 schematically illustrates aspects of the operation of the Move controller 330 in more detail.

As mentioned above, the Move controller 330 houses an Inertial Measurement Unit (IMU) 332. Inertial measurements are considered, for the purposes of this description, to encompass one or more of: accelerometer detections; and gyroscopic detection. The games console 300 is connected to the camera 305 which, for the purposes of this explanation, is assumed to be directed towards the Move controller 330.

In operation, the camera 305 captures images including images of the illuminated end portion 110 of the Move controller 330. These are processed by an image processor 312 to identify a location, with respects to the frame of reference of the captured images, of the illuminated end portion 110.

An IMU data receiver 314 receives wireless telemetry 316 from the IMU 332, for example via a Bluetooth® wireless link provided by a wireless interface 334 forming part of the IMU. The telemetry signals 316 indicate inertial measurements performed by the IMU 332, for example accelerometer and gyroscopic measurements indicating an orientation of the Move controller 330 or at least changes in its orientation.

Data provided by the image processor 312 indicative of the location of the illuminated end portion 110 in the captured images and data provided by the IMU data receiver 314 are processed by a location and orientation detector 318 which provides an output signal 332 indicative of any current location and orientation of the Move controller 320, or at least changes in the location and orientation. Note that these changes can be used in the arrangement of FIG. 3 to control game play, for example. In the camera frame calibration process discussed below, changes in location are relevant, but not necessarily changes in orientation.

This information provided by the signal 322 can be used in various different ways as a generic control input to a data processing operation. Purely by way of example, in the arrangement shown schematically in FIG. 3, the signal 322 is provided to a control function generator 324 which generates control information 326 to control aspects of the operation of a game engine 328 executing a computer game. As part of its operation, the game engine may generate display signals to drive one or more displays 332 such as the one or more displays in the HMD 20 and/or a further display such as so-called social screen for viewing by users who are not currently wearing the HMD 20.

Figure 4:
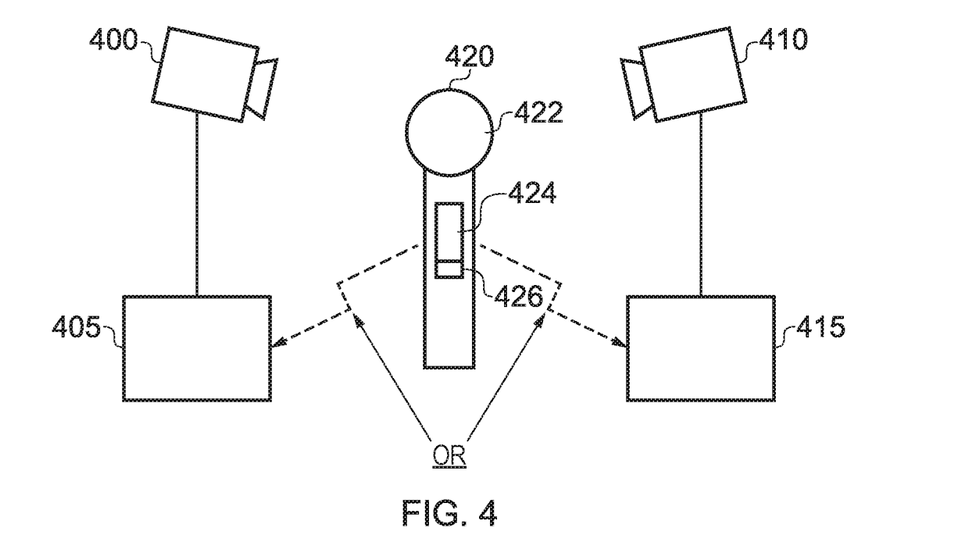
FIG. 4 schematically illustrates an issue which can arise if two games consoles track a single control device.

FIG. 4 schematically illustrates an issue which can arise in, for example, a so-called mixed reality arrangement such as a video game arrangement in which the games console 300 is configured to generate a mixed reality video signal for display to a user 10 (for example via the HMD 20) in dependence upon images captured by plural video cameras and images (which may be generated by the games console 300) indicative of a virtual environment.

In executing such a mixed reality operation, more than one video camera is generally required because it is necessary to capture the real environment around the user from multiple different angles in order to generate the mixed reality environment for display to the user. In FIG. 4, two video cameras 400, 410 are shown, each associated with a respective games console 405, 415 which includes the features shown as part of the games console 300 of FIG. 3 and described above.

A Move controller 420 is provided. While it is possible for both cameras to track the illuminated end portion 422 of the Move controller 420, system restriction prevent the IMU 424 of the Move controller 420 (via its wireless link 426) communicating with both the games console 405 and the games console 415.

Having both of the games consoles 405, 415 track the Move controller 420 can be particularly useful not only during potential gameplay situations in a mixed reality environment for example, but also during a calibration fade in which the relative locations of the cameras 400, 410 are determined by using both cameras 400, 410 to track a common object (the Move controller 420).

However, for the reasons discussed above, this is not possible using a single Move controller.

One possibility to address this would be to register a second Move controller (with that one of the games consoles 405, 415 not tracking the Move controller 420) and keep it out of sight so that it is not tracked by the respective video camera. However, then the motion capture results between the two games consoles 405, 415 would not correlate. This is because the tracking system used to detect the location of the Move controller 420 is driven, and discussed above, using a combination of IMU data and captured images of the illuminated end portion 422.

So, a solution is not necessarily provided by registering a second Move controller but keeping it out of sight.

Figure 5:
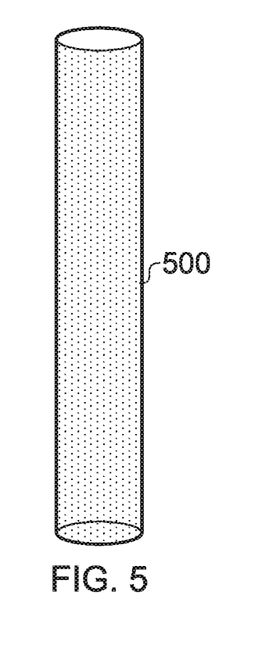
FIG. 5 schematically illustrates a housing.
Figure 6:
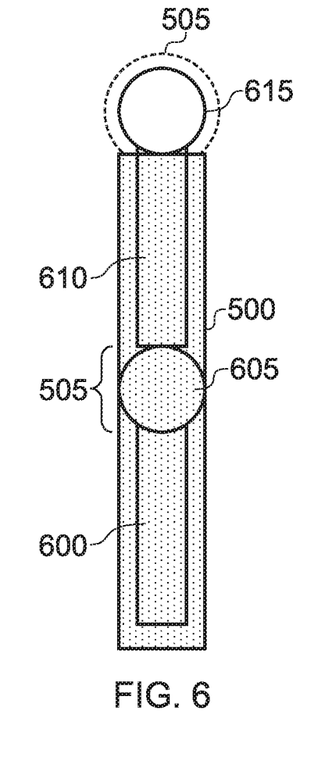
FIG. 6 schematically illustrates a control apparatus formed of the housing of FIG. 5 populated by a pair of control devices.

FIG. 5 and FIG. 6 schematically illustrate an arrangement which can alleviate this problem.

FIG. 5 schematically illustrates a housing 500 to house a pair of Move controllers and FIG. 6 schematically illustrates the housing 500 populated with a first 600 and second 610 Move controller. It can be seen that housing 500 has the form (in this example) of a tube such that the Move controllers 600, 610 may be fitted inside the tube. The tube is made (at least in part) of a non-transparent, or translucent, material such that the illuminated end portion 605 of the Move controller 600 is obscured from view by either of the cameras 400, 410. However, the illuminated end portion 615 of the Move controller 610 protrudes from the housing 500 (or alternatively is contained within a transparent end portion 505) so that it may be seen by the video cameras 400, 410.

FIG. 6 therefore provides an example of a control apparatus comprising:

two or more user control devices 600, 610, each user control device having an inertial detector 424 having a wireless communications module 426 to communicate inertial detection results, and an illuminated portion 605, 615; and a housing 500 to house the two or more control devices so that the two or more control devices are constrained to move with one another but having an obscured portion so as to obscure all (605) but one (615) of the illuminated portions of the two or more control devices 600, 610.

Note that it is not necessarily a requirement that the whole of the housing 500 is obscured; a portion 505 surrounding the illuminated portion 605 could be obscured, and the remainder not obscured (for example, being transparent or even an open frame structure), for example.

The tubular housing 500 of FIG. 5 provides an example of a generally tubular housing inside which the two or more control devices are mountable adjacently in a lengthwise direction. In some examples, the housing is formed of a non-transparent or translucent material such as a plastics material.

Figure 7:
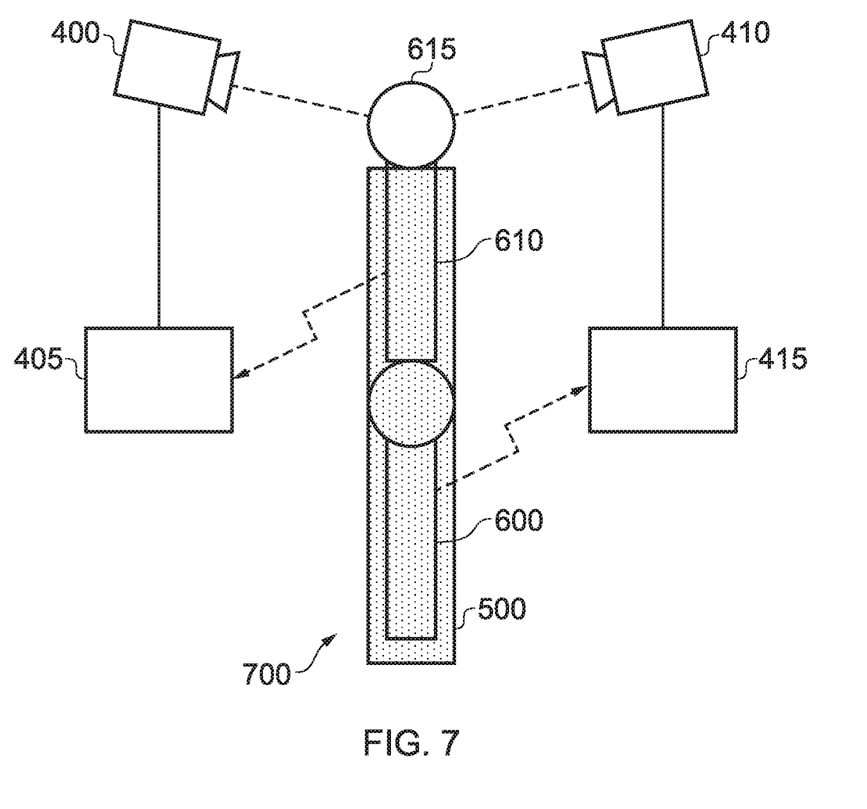
FIG. 7 schematically illustrates the tracking of the control apparatus of FIG. 6.

FIG. 7 schematically illustrates the operation of such an arrangement, in which the end portion 615 is tracked by the video camera 400 and the video camera 410.

In terms of the IMU data, one of the Move controllers such as the Move controller 610 provides IMU data to the games console 405 and the other Move controller 600 provides IMU data to the games console 415.

Using this arrangement, at least in a calibration phase during which the relative location of plural video cameras is determined, the housing 500 carrying the multiple Move controllers 600, 610 but allowing the illuminated end portion 615 to be visible can be tracked by both of the cameras and games consoles of FIG. 7. This arrangement can be used to capture multiple points in the space of each camera which can be correlated to one another by the respective location detectors 318 detecting their location. This data can be used to create a mapping between locations as viewed by each of the cameras so that when images captured by the multiple cameras are combined together in a mixed reality display, for example, features at corresponding locations within the view of the multiple cameras are correctly associated with one another.

In principle a housing similar to the housing 500 could be provided which encompasses more than two Move controllers, still with just one illuminated end portion protruding or otherwise visible, so that more than two cameras may be mapped together in this way. However, another option where more than two cameras are in use is to generate mappings between them on a pair-wise basis, in other words two at a time.

FIG. 7 therefore provides an example of a data processing system comprising:

a control apparatus 700;

two or more data processing devices 405, 415, a respective data processing device being associated with each of the two or more user control devices 600, 610 so as to receive inertial detection results from that user control device;

two or more video cameras 400, 410, a respective video camera being associated with each data processing device and each being configured to capture images of the non-obscured illuminated portion;

in which each data processing device is configured to detect a location of the control apparatus from images captured by the respective camera of the non-obscured illuminated portion and from inertial detection results received from the respective control device.

By comparing the location data at particular physical positions of the control apparatus, the system of FIG. 7 (for example, one of the devices 405, 415 or another device (not shown)) can be configured to detect a mapping between respective frames of reference of the two or more video cameras by correlating the location of the control apparatus as detected by each data processing device.

Figure 8:
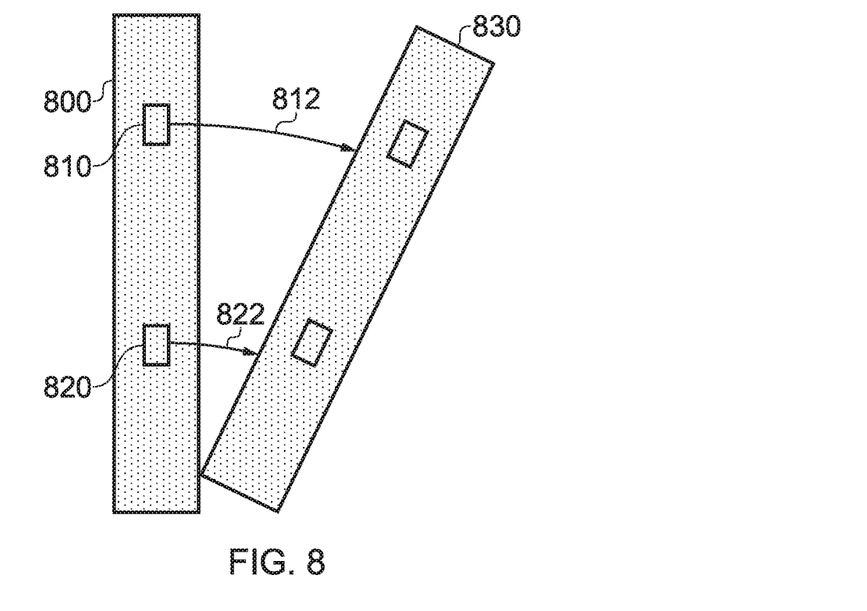
FIG. 8 schematically illustrates the rotation of the apparatus of FIG. 6.
Figure 9:
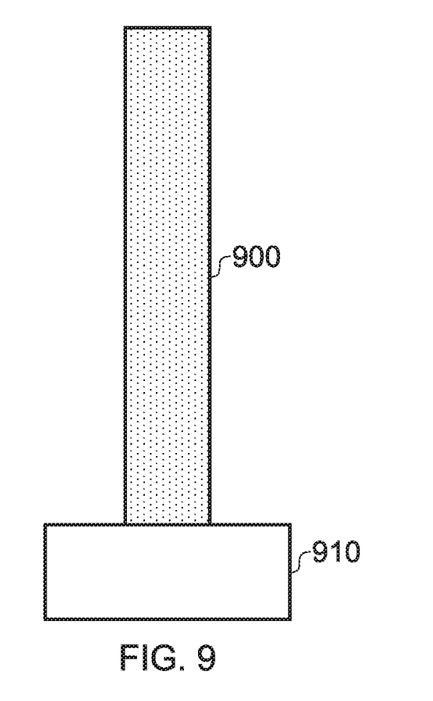
FIG. 9 schematically illustrates the use of stabilising apparatus to inhibit rotation of FIG. 8.

FIGS. 8 and 9 schematically illustrate further possible refinements of the arrangements discussed above.

Referring to FIG. 8, the housing 800 and the location 810, 820 of the two IMUs are illustrated in a vertical orientation. If the housing is rotated to a non-vertical orientation shown by the representation 830, the movement 812, 822 experienced by the two IMUs is different. Since the two IMUs are being tracked by different respective games consoles 405, 415 in the arrangement of FIG. 7, this could lead to discrepancies in the detected results and potential errors in the cross-mapping of reference of the multiple cameras 400, 410.

To address this, FIG. 9 schematically illustrates the housing 900 mounted with respects to a stabilising apparatus 910 such as a camera stabiliser used to mount a video camera for hand-held or shoulder-mounted operation, and which includes weighting, gyroscopes and the like tends to maintain the housing 900 in an upright orientation in use. Since this arrangement may be in operation only during a calibration phase, it can be acceptable to use such a stabilisation method even though to do so during gameplay may be onerous for the player.

FIG. 9 therefore provides an example of the use of stabiliser apparatus associated with the housing to inhibit rotation of the long axis of the housing.

Figure 10:
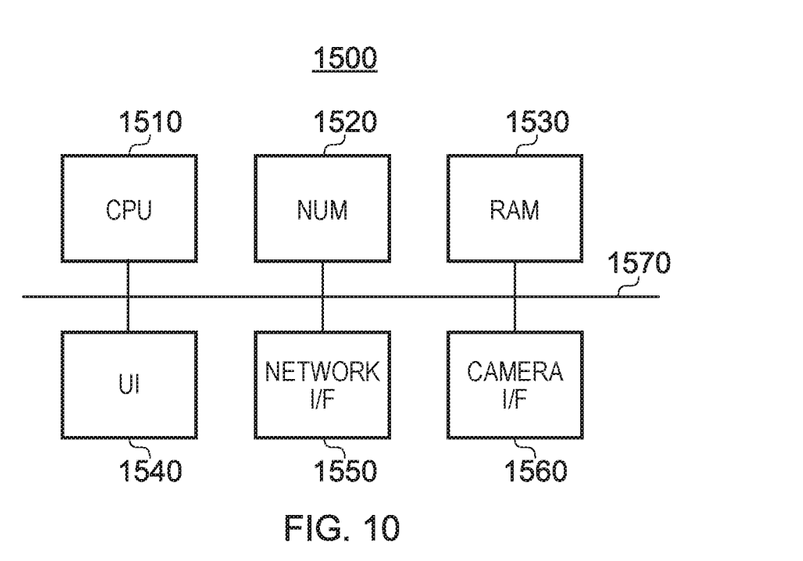
FIG. 10 schematically illustrates a data processing device or apparatus.

FIG. 10 schematically illustrates a data processing apparatus or device such as the games console 300. The apparatus 1500 comprises one or more processing elements such as a central processing unit 1510 (CPU), a non-volatile memory 1520 such as a read only memory (ROM), a flash memory, a magnetic or optical disk or the like, a random access memory (RAM) 1530, a user interface 1540, a network interface 1550 to provide connectivity with different apparatus in the system, and (at least for the control apparatuses) a camera interface 1560. All of these elements are interconnected by a bus structure 1570. In operation, program code is stored in the non-volatile memory 1520 and transferred to the random access memory 1530 for execution i.e. CPU 1510 to perform the functionality discussed above.

Note that although different apparatuses have been provided in the examples given above for the data processing apparatus 1020 and the earlier control apparatuses, these functions could be shared by a common apparatus executing at various different tasks, for example.

Figure 11:
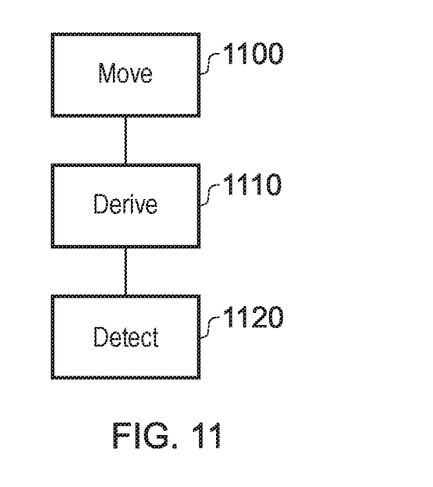
FIG. 11 is a schematic flowchart illustrating a method.

FIG. 11 is a schematic flowchart illustrating a method comprising:

moving (at a step 1100) a control apparatus according to claim 1 to a plurality of locations within view of two or more video cameras;

deriving (at a step 1110) two or more sets of location data by capturing images of the control apparatus using the two or more video cameras, and in respect of each video camera, detecting inertial detection results received from a respective one of the control devices; and detecting (at a step 1120) a mapping between respective frames of reference of the two or more video cameras by correlating the two or more sets of location data.

It will be appreciated that in example embodiments the techniques discussed above, including the method of FIG. 11, can be implemented by computer software operating on a general purpose computing system such as one or more games machines which may have the form of the apparatus of FIG. 10. In these examples, computer software, which when executed by a computer, causes the computer to carry out any of the methods discussed above is considered as an embodiment of the present disclosure. Similarly, embodiments of the disclosure are provided by a non-transitory, machine-readable storage medium (such as the medium 1520) which stores such computer software.

It will also be apparent that numerous modifications and variations of the present disclosure are possible in light of the above teachings. It is therefore to be understood that within the scope of the appended claims, the disclosure may be practised otherwise than as specifically described herein.

The invention claimed is:

1. A control apparatus comprising:

two or more user control devices, each user control device having an inertial detector having a wireless communications module to communicate inertial detection results, and an illuminated portion; and a housing to house the two or more control devices so that the two or more control devices are constrained to move with one another but having an obscured portion so as to obscure all but one of the illuminated portions of the two or more control devices.

2. A control apparatus according to claim 1, in which each control device comprises an elongate handle portion which houses the inertial detector and an illuminated end portion at an end of the handle portion.

3. A control apparatus according to claim 2, in which the housing comprises a generally tubular housing inside which the two or more control devices are mountable adjacently in a lengthwise direction.

4. A control apparatus according to claim 3, in which the housing is formed of a non-transparent or translucent material.

5. A control apparatus according to claim 1, comprising stabiliser apparatus associated with the housing to inhibit rotation of the long axis of the housing.

6. A data processing system comprising:
a control comprising: (i) two or more user control devices, each user control device having an inertial detector having a wireless communications module to communicate inertial detection results, and an illuminated portion; and (ii) a housing to house the two or more control devices so that the two or more control devices are constrained to move with one another but having an obscured portion so as to obscure all but one of the illuminated portions of the two or more control devices;
two or more data processing devices, a respective data processing device being associated with each of the two or more user control devices so as to receive inertial detection results from that user control device;
two or more video cameras, a respective video camera being associated with each data processing device and each being configured to capture images of the non-obscured illuminated portion;
in which each data processing device is configured to detect a location and orientation of the control apparatus from images captured by the respective camera of the non-obscured illuminated portion and from inertial detection results received from the respective control device.

7. A system according to claim 6, configured to detect a mapping between respective frames of reference of the two or more video cameras by correlating the location and orientation of the control apparatus as detected by each data processing device.

8. A method comprising:
moving a control apparatus to a plurality of locations within view of two or more video cameras, the control apparatus including: (i) two or more user control devices, each user control device having an inertial detector having a wireless communications module to communicate inertial detection results, and an illuminated portion, and (ii) a housing to house the two or more control devices so that the two or more control devices are constrained to move with one another but having an obscured portion so as to obscure all but one of the illuminated portions of the two or more control devices;
deriving two or more sets of location data by capturing images of the control apparatus using the two or more video cameras, and in respect of each video camera, detecting inertial detection results received from a respective one of the control devices;
detecting a mapping between respective frames of reference of the two or more video cameras by correlating the two or more sets of location data.

9. A non-transitory computer-readable storage medium which stores computer software, which when executed by a computer, causes the computer to carry out actions, comprising:
moving a control apparatus to a plurality of locations within view of two or more video cameras, the control apparatus including: (i) two or more user control devices, each user control device having an inertial detector having a wireless communications module to communicate inertial detection results, and an illuminated portion, and (ii) a housing to house the two or more control devices so that the two or more control devices are constrained to move with one another but having an obscured portion so as to obscure all but one of the illuminated portions of the two or more control devices;
deriving two or more sets of location data by capturing images of the control apparatus using the two or more video cameras, and in respect of each video camera, detecting inertial detection results received from a respective one of the control devices;
detecting a mapping between respective frames of reference of the two or more video cameras by correlating the two or more sets of location data.

* * * * *